(12) United States Patent
Weiss et al.

(10) Patent No.: US 12,221,946 B2
(45) Date of Patent: Feb. 11, 2025

(54) METHOD FOR OPERATING AN INTERNAL COMBUSTION ENGINE, IN PARTICULAR OF A MOTOR VEHICLE

(71) Applicants: Bayerische Motoren Werke Aktiengesellschaft, Munich (DE); Vitesco Technologies GmbH, Regensburg (DE)

(72) Inventors: Rene Weiss, Freising (DE); Michael Kluge, Munich (DE)

(73) Assignees: Bayerische Motoren Werke Aktiengesellschaft, Munich (DE); Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/290,989

(22) PCT Filed: May 2, 2022

(86) PCT No.: PCT/EP2022/061690
§ 371 (c)(1),
(2) Date: Jan. 22, 2024

(87) PCT Pub. No.: WO2023/001420
PCT Pub. Date: Jan. 26, 2023

(65) Prior Publication Data
US 2024/0254955 A1 Aug. 1, 2024

(30) Foreign Application Priority Data
Jul. 22, 2021 (DE) .......................... 102021118991.8

(51) Int. Cl.
*F02P 5/00* (2006.01)
*F02P 5/152* (2006.01)

(52) U.S. Cl.
CPC ........... *F02P 5/1522* (2013.01); *F02P 5/1525* (2013.01)

(58) Field of Classification Search
CPC ..... F02P 5/1522; F02P 5/1525; F02D 41/222; F02D 35/027; G01M 15/11; G01L 23/221
See application file for complete search history.

(56) References Cited

U.S. PATENT DOCUMENTS

| | | | | |
|---|---|---|---|---|
| 5,131,368 A | * | 7/1992 | Komurasaki | F02P 5/1526 123/406.16 |
| 6,769,402 B2 | * | 8/2004 | Franke | F02P 5/1526 123/406.16 |

(Continued)

FOREIGN PATENT DOCUMENTS

| | | |
|---|---|---|
| DE | 19946346 A1 | 3/2001 |
| DE | 102019102867 A1 | 8/2019 |

(Continued)

*Primary Examiner* — Phutthiwat Wongwian
*Assistant Examiner* — Sherman D Manley
(74) *Attorney, Agent, or Firm* — Fox Rothschild LLP

(57) ABSTRACT

The invention relates to a method for operating an internal combustion engine, in which the internal combustion engine has at least one first combustion chamber, in which combustion processes take place during fired operation of the first combustion chamber, at least one second combustion chamber, in which combustion processes take place during a fired operation of the second combustion chamber, a first knock sensor assigned to the first combustion chamber, by means of which irregular combustions in the first combustion chamber can be detected, and a second knock sensor assigned to the second combustion chamber, by means of which irregular combustions in the second combustion chamber can be detected. The internal combustion engine is operated in a first operating state in which channel switching (Continued)

is carried out. A switch is made from the first operating state to a second operating state in which channel switching does not take place.

10 Claims, 2 Drawing Sheets

(56) References Cited

U.S. PATENT DOCUMENTS

| | | | |
|---|---|---|---|
| 7,769,536 B2* | 8/2010 | Hamama | F02D 41/222 701/111 |
| 10,156,220 B1* | 12/2018 | Dudar | F02D 35/027 |
| 2016/0258378 A1* | 9/2016 | Bizub | F04B 51/00 |
| 2018/0073457 A1* | 3/2018 | Dudar | G01L 23/22 |

FOREIGN PATENT DOCUMENTS

| | | |
|---|---|---|
| DE | 102019126090 A1 | 4/2020 |
| DE | 102019131107 A1 | 5/2020 |

* cited by examiner

METHOD FOR OPERATING AN INTERNAL COMBUSTION ENGINE, IN PARTICULAR OF A MOTOR VEHICLE

RELATED APPLICATIONS AND CLAIM OF PRIORITY

This application is a national phase filing of International Patent Application No. PCT/EP2022/061690 filed May 2, 2022, which claims priority to German Patent Application No. 102021118991.8 filed Jul. 22, 2021, the entirety of both applications are incorporated herein by reference in their entirety.

TECHNICAL FIELD

The invention relates to a method for operating an internal combustion engine, in particular a motor vehicle.

BACKGROUND

EP 3 023 619 B1 discloses a method for controlling combustion in an internal combustion engine with at least one cylinder as known. JP H0494440 A1 and DE 41 24 751 A1 disclose an ignition timing control device. From WO 2010/124699 A1 a method is known for suppressing irregular combustion in a combustion chamber of an internal combustion engine, which occurs in particular before a predetermined ignition timing. DE 10 2007 039 036 B4 discloses a method for detecting and preventing premature combustion events. DE 11 2012 003 783 B4 discloses an internal combustion engine as known. In addition, DE 10 2009 008 248 B4 discloses a method for preventing pre-ignition in cylinders of a gasoline-powered internal combustion engine.

SUMMARY

The object of the present invention is to create a method so that an internal combustion engine, in particular of a motor vehicle, can be operated particularly advantageously.

This object is achieved according to the invention by a method with the features of patent claim 1. Advantageous embodiments with useful developments of the invention are specified in the remaining claims.

BRIEF DESCRIPTION OF THE DRAWINGS

Further details of the invention result from the following description of a preferred exemplary embodiment with the associated drawings. This shows.

In the figures, identical or functionally identical elements are provided with the same reference numerals.

DETAILED DESCRIPTION

Figure 1:
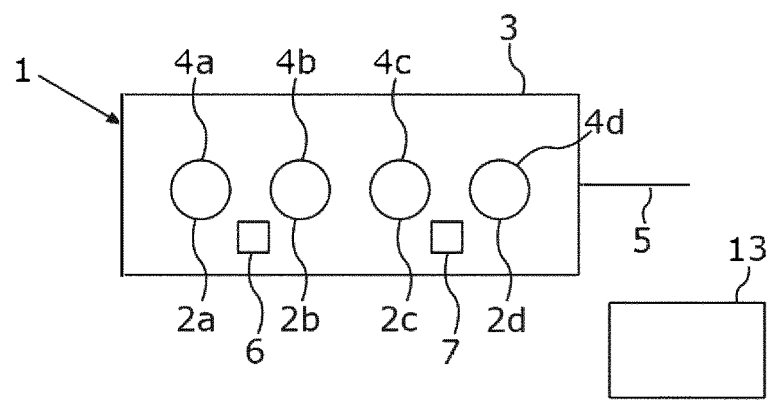
FIG. 1 is a schematic representation of an internal combustion engine of a motor vehicle.

The invention relates to a method for operating an internal combustion engine, in particular a motor vehicle, which is preferably designed as a reciprocating piston internal combustion engine and also referred to as an internal combustion motor, motor or combustion motor. This means that the motor vehicle, which is preferably designed as a passenger vehicle, in particular as a passenger car, has the internal combustion engine in its fully manufactured state and can be driven by means of the internal combustion engine. For example, in the method the motor vehicle is driven by the internal combustion engine. In the method, the internal combustion engine has at least one first combustion chamber in which combustion processes take place during fired operation of the first combustion chamber. It is preferable for the first combustion chamber to be operated in its fired mode during the process. In the method, the internal combustion engine further has at least one second combustion chamber in which combustion processes take place during fired operation of the second combustion chamber. It is preferably provided that in the method the second combustion chamber is operated in its fired mode. The respective combustion process is also referred to as combustion or during the respective combustion process a respective combustion takes place, in which a fuel-air mixture comprising at least fuel and air and also simply referred to as a mixture is burned. The fuel is preferably a liquid fuel which is introduced into the respective combustion chamber during fired operation, in particular injected directly. In the respective fired operation and within a respective working cycle of the internal combustion engine, the respective mixture contained in the respective combustion chamber is ignited in particular at an ignition timing, also referred to as the ignition angle, and is subsequently burned. The internal combustion engine is preferably a spark-ignited internal combustion engine, in particular a gasoline engine, so that, for example, the respective mixture is ignited at the respective ignition timing by spark ignition, that is, by means of an ignition device such as a spark plug. The respective combustion chamber is formed or delimited, for example, by a respective cylinder of the internal combustion engine and by a respective piston of the internal combustion engine which is movable, in particular translationally movable, in the respective cylinder. For example, the piston is coupled in an articulated manner, in particular via a connecting rod, to an output shaft of the internal combustion engine, which is designed in particular as a crankshaft. The output shaft is, for example, rotatably mounted on the housing element about an axis of rotation relative to a housing element of the internal combustion engine, wherein for example the housing element has or forms the cylinders.

The respective working cycle of the internal combustion engine preferably comprises exactly two complete revolutions, i.e. exactly 720 degrees crank angle [° CA] of the output shaft, which is preferably designed as a crankshaft. For example, the respective piston can be moved back and forth between a respective top dead center and a respective bottom dead center, in particular translationally. Within the respective working cycle, the respective piston comes, in particular precisely, twice to its respective top dead center and to its respective bottom dead center. As is well known, one of the top dead centers of the respective piston occurring within the respective working cycle is referred to as the top ignition dead center or ignition dead point (TDC), since the respective ignition timing within the respective working cycle lies in the top ignition dead center, shortly before the top ignition dead center or shortly after the top ignition dead center, in any case the ignition timing is closer to the top ignition dead center than to the other top dead center of the respective piston that occurs within the respective working cycle, also known as the top gas cycle dead center (GCDC).

The internal combustion engine also has a first knock sensor, which is assigned to the first combustion chamber. Irregular combustions in the first combustion chamber can be detected using the first knock sensor. This means that irregular combustions occurring in the first combustion chamber can be detected using the first knock sensor. The internal combustion engine also has a second knock sensor assigned to the second combustion chamber, by means of which irregular combustions in the second combustion chamber, that is to say irregular combustions occurring in the second combustion chamber, can be detected. Such an irregular combustion can be, for example, a knocking combustion, which is also referred to as knocking. Furthermore, irregular combustion can involve pre-ignition of the mixture. As is well known, when knocking occurs in the combustion chamber, several, i.e. at least two or more ignition cores are created, at which combustion of the mixture begins or from which combustion of the mixture proceeds. A pre-ignition is to be understood in particular as an ignition or combustion that begins before the actual ignition timing, that is, before the targeted ignition of the mixture caused by the ignition device.

In the method, the internal combustion engine is operated, in particular initially, in a first operating state, which is also referred to as normal operation or normal operating state. In the first operating state (normal operating state), a channel switch is carried out, in which a knock control of the internal combustion engine alternately evaluates a first signal provided by the first knock sensor during a respective first time period and a second signal provided by the second knock sensor during a respective second time period, which is preferably, in particular immediately after the first time period. The respective signal is preferably an electrical signal. The knock control is, for example, an electronic computing device or is carried out by an electronic computing device, which is also referred to, for example, as an engine control or engine control unit. In particular, the knock control can be a functional module, also referred to simply as a module or function, of one or more of the aforementioned electronic computing devices, by means of which the internal combustion engine is operated, in particular controlled or regulated. As will be explained in more detail below, the respective ignition timing for the respective combustion chamber, that is to say the respective combustion chamber, is set by means of the knock control and thus by means of the electronic computing device, in particular within the respective working cycle, that is to say for the respective working cycle. In other words, the respective ignition timing for the respective combustion chamber and for the respective working cycle is determined by means of the knock control. For example, the respective signal provided by the respective knock sensor, also simply referred to as a sensor, characterizes the respective combustion process that takes place in the respective combustion chamber to which the respective knock sensor is assigned, and is detected by the respective knock sensor.

Channel switching is to be understood in particular as meaning that the channel switching is carried out, in particular continuously, during the first operating state. This means that several first work cycles of the internal combustion engine take place during the first operating state, so that the first operating state includes the several first work cycles of the internal combustion engine. The channel switching takes place within the, in particular all, work cycles of the internal combustion engine that are running or taking place in or during the first operating state. Thus, in the first operating state and thus, for example, within a time interval during which the internal combustion engine is operated, in particular continuously, in the first operating state, the respective first time period and the respective second time period follow one another several times and in alternation with each other, so that the time interval or the first operating state has multiple first time periods and multiple second time periods. In particular, it is provided that the time periods directly follow one another, so that there is no other, third time period between the time periods. Furthermore, it is preferably provided that during the first period of time during which the knock control reads out, that is to say evaluates, the first signal, the knock control does not read out or evaluate the second signal. Furthermore, it is preferably provided that during the second period of time during which the knock control evaluates the second signal, the knock control does not evaluate the first signal.

In the first operating state, the knock control sets the ignition timing for the first combustion chamber, that is to say the first combustion chamber, depending on the evaluation of the first signal, in particular within the respective working cycle or for the respective working cycle. It is also provided that in the first operating state the knock control sets the ignition timing for the second combustion chamber, that is to say the second combustion chamber, depending on the evaluation of the second signal, in particular within the respective working cycle or for the respective working cycle.

If it is determined, that is, detected or recognized, that one of the knock sensors is malfunctioning, that is, inoperable, and the other knock sensor is (still) operable, that is, functional, the method switches from the first operating state to a second operating state, which also referred to as error operation or error operating state. The inoperability of the one knock sensor or the fact that it is determined that the one knock sensor is inoperable is to be understood as meaning that, for example, by means of a diagnostic function, in particular the electronic computing device, it is determined that the one knock sensor is no longer (or no longer) operable, that is to say is no longer able to detect irregular combustion occurring in the combustion chamber to which the one knock sensor is assigned and/or to provide its signal, and/or the knock control system is no longer able to receive the signal provided by the a sensor and/or no longer recognize whether there is irregular combustion or not based on the signal provided by the knock sensor. For example, one knock sensor is then inoperative, that is, for example, it is recognized that one knock sensor is inoperative when one knock sensor no longer provides a signal and/or the knock control no longer receives a signal from one knock sensor and/or when the signal provided by a sensor is implausible, that is, if it is recognized that the signal provided by the knock sensor no longer characterizes the combustion processes that take place in the combustion chamber to which the one knock sensor is assigned.

In the second operating state, channel switching does not take place. This means that the channel switching is ended by switching from the first operating state to the second operating state. This means in particular that channel switching, particularly continuous, does not take place during the second operating state. This is to be understood in particular as meaning that several second working cycles of the internal combustion engine take place during the second operating state, so that the second operating state comprises multiple second working cycles of the internal combustion engine. In this case, channel switching does not take place during the, in particular all, work cycles of the internal combustion engine that are running or taking place in or during the second operating state.

By ending the channel switching, that is, by switching to the second operating state, the knock control only evaluates the signal provided by the other, (still) functional knock sensor based on the signals provided by the knock sensors in the first operating state and in particular evaluated by the knock control. In order to describe the invention in a clear and easy-to-read manner below, it is assumed in the following as an example that the one non-functional knock sensor is the first knock sensor, also referred to as the first sensor, and that the other, (still) functional knock sensor is the second knock sensor, also known as the second sensor. In other words, one knock sensor is viewed below as the first knock sensor and the other knock sensor as the second knock sensor, although the reverse is of course also possible. Thus, for example, in the second operating state it is provided that, because the channel switching does not occur in the second operating state, the knock control only evaluates the second signal provided by the second knock sensor based on the signals provided by the knock sensors in the first operating state.

In particular, channel switching means the following: For example, a first channel is provided via which the first signal can be transmitted to the knock control, in particular to an input of the knock control, and thus can be received by the knock control. Furthermore, for example, a second channel is provided in addition to the first channel, via which, for example, the second signal can be transmitted to the knock control, in particular to the input, and received by the knock control. For example, when switching channels, the first signal and the second signal are applied to the input and thus to the knock control several times alternately and successively, so that during the respective first time period the first signal and during the respective second time period the second signal is applied, i.e. transmitted, to the knock control input. In particular, channel switching may involve alternately connecting the first channel and the second channel to the input multiple times, in particular using signal technology or signal transmission technology. This can be understood in particular to mean that, for example, during the respective, first time period, the input of the knock control is connected to the first channel and separated from the second channel, wherein during the respective, second time period, the input of the knock control is connected to the second channel and separated from the first channel. This is done, for example, by means of a switching direction, by means of which the input is switched between the channels during channel switching, so that during the respective first time period the input is connected to the first channel and separated from the second channel, and so during the respective second time period the input is connected to the second channel and separated from the first channel. This takes place in the first operating state, for example within the or all work cycles of the internal combustion engine that take place during the first operating state.

Against this background, for example, the feature that channel switching does not occur in the second operating state, whereby the knock control only evaluates the signal provided by the other, functional knock sensor based on the signals provided by the knock sensors in the first operating state, means that in the second operating state, the knock control, in particular the input of the knock control, in particular continuously, is connected to the second channel and separated from the first channel, that is to say is connected to the channel via which the signal can be transmitted, which can be provided or is provided from the other (still) functional sensor, while the knock control, in particular the input of the knock control, is separated from the other channel via which the signal can be transmitted, which can be or was provided by the one, non-functional sensor. This is provided in particular within the or all work cycles of the internal combustion engine that take place during the second operating state. Based on the aforementioned example, in which the one non-functional knock sensor is the first knock sensor and the other, still functional knock sensor is the second knock sensor, the knock control, in particular the input of the knock control, is therefore connected to the second channel, for example in the second operating state and separated from the first channel, preferably during the entire second operating state or during all working cycles of the second operating state.

Since the respective mixture is ignited both in the first combustion chamber and in the second combustion chamber within the respective working cycle of the internal combustion engine and thus a respective combustion process takes place, it is provided during the channel switching, that is to say when carrying out the channel switching, that within the respective working cycle of the internal combustion engine, the knock control, in particular the input of the knock control, is switched at least once from one of the channels to the other channel, that is to say it is separated from one of the channels to which the input is initially connected and connected to the other channel to which the input is initially disconnected. Then, for example, within the respective working cycle, the knock control, in particular the input of the knock control, is switched from the other channel to the one channel, that is to say is (again) separated from the other and (again) connected to one channel. Thus, for example, within the respective working cycle and in particular in the first operating state, the channel switching is carried out at least once, in particular at least twice. Since channel switching does not occur in the second operating state, it is provided in the second operating state that channel switching does not occur within the respective, entire working cycle occurring during the second operating state or in the second operating state, it being in particular provided that during the or all of the working cycles of the internal combustion engine that occur in the second operating state, channel switching is completely omitted, so that, based on the aforementioned example, in the second operating state, that is to say during the second operating state, the knock control, in particular the input of the knock control, is connected continuously or without interruption to the second channel and from is and remains separated from the first channel, so that in particular during the second operating state, in particular completely and continuously or without interruption, the knock control, in particular the input of the knock control, is not connected to the first channel.

The method further provides that in the second operating state, the knock control sets the ignition timing for the (second) combustion chamber, which is assigned to the other functional (second) knock sensor, depending on the evaluation of the (second) signal provided by the other functional (second) knock sensor. In addition, it provides that in the second operating state the knock control sets the ignition timing for the (first) combustion chamber, to which the one non-functional (first) knock sensor is assigned, depending on the evaluation of the (second) signal provided by the other functional (second) knock sensor. Thus, in the second operating state, the other knock sensor, that is, its signal, is used to set the respective ignition timing for both the first combustion chamber as well as the second combustion chamber and for the respective working cycle. In particular, it provides In particular, it provides that in the second operating state, the ignition timing for the first combustion chamber and the ignition timing for the second combustion chamber are not set as a function of the one inoperative knock sensor, i.e. in particular as a function of the signal from the one inoperative knock sensor. The invention is based in particular on the following findings:

It is usually provided that if one of the knock sensors fails in an internal combustion engine with several combustion chambers and several knock sensors, the filling of the combustion chambers, also referred to as cylinder filling, and thus the maximum torque that can be provided by the internal combustion engine and also referred to as engine torque, in particular, the maximum load that can be provided by the internal combustion engine compared to a normal state in which all knock sensors are functional can be reduced in order to safely avoid irregular combustion, such as pre-ignition, in particular in the combustion chamber or combustion chambers whose associated knock sensor has failed, i.e. is inoperable. Although damage to the internal combustion engine can be avoided in this way, compared to the normal state, which is, for example, the aforementioned normal operating state, the internal combustion engine is less drivable because the engine torque is reduced.

In order to avoid undesirable damage to the internal combustion engine on the one hand and in particular to be able to avoid undesirable, irregular combustions such as pre-ignition if one of the knock sensors fails, but on the other hand to be able to achieve advantageous drivability, the method according to the invention moves from the first operating state to the second operating state switched and thus the channel switching is canceled. As a result, the knock control can use the (still) functional, other knock sensor, that is, based on the signal provided by the other, functional knock sensor and received by the knock control, to detect any irregular combustion, such as knocking and in particular pre-ignition, both in the combustion chamber as well as in the second combustion chamber and counteract such irregular combustions accordingly, in particular by retarding the respective ignition timing. It is possible to change the ignition position as much as necessary, that is, for example, to retard it as much as necessary, but on the other hand to change it as little as necessary, i.e. for example, to retard it as little as possible, in order to avoid unwanted, irregular combustions. Excessive filling reduction can be avoided compared to traditional solutions. In particular, a reduction in filling at all can be avoided. Thus, on the one hand, the method according to the invention makes it possible to avoid damage to the internal combustion engine, and on the other hand, the method according to the invention makes it possible to continue to provide a sufficiently high engine torque even if one of the knock sensors fails. For this purpose, the method uses the knock sensor that is still available, i.e. still functional, in order to detect irregular combustion both in the combustion chamber to which the other, still functional sensor is assigned, and in the combustion chamber to which the one, non-functional knock sensor is actually assigned.

In order to realize a particularly advantageous operation, in one embodiment of the invention provides that in the first operating state the ignition timing for the first combustion chamber does not depend on the second signal and the ignition timing for the second combustion chamber does not depend on the first signal. In other words, in the first operating state, the first knock sensor is assigned exclusively to the first combustion chamber in relation to the combustion chambers, and the second knock sensor is exclusively assigned to the second combustion chamber in relation to the combustion chambers.

A further embodiment is characterized in that in the second operating state, setting the ignition timing for the (second) combustion chamber, to which the other, functional (second) knock sensor is assigned, includes that the ignition timing for the (second) combustion chamber, to which the another, functional (second) knock sensor is assigned, based on an initial value is adjusted later by a correction value, also referred to as the first correction value. In this way, undesirable, irregular combustion and thus damage to the internal combustion engine can be safely avoided, so that an especially advantageous operation can be achieved.

It has proven to be especially advantageous if, in the second operating state, the setting of the ignition timing for the (first) combustion chamber, to which the one non-functional (first) knock sensor is assigned, includes that the ignition timing for the (first) combustion chamber, to which to which a non-functional (first) knock sensor is assigned, is adjusted later by a second correction value based on a second initial value. In this way, irregular combustion occurring in the first combustion chamber and thus damage to the internal combustion engine can be reliably avoided. The output values can be the same or different from each other. The correction values can be the same, or preferably the correction values are different from one another.

In order to be able to particularly reliably avoid irregular combustion and thus damage to the internal combustion engine if one of the knock sensors fails, a further embodiment of the invention provides that the second correction value is determined as a function of the first correction value. Thus, based on the aforementioned example, the second combustion chamber and the still functional second knock sensor assigned to the second combustion chamber are used as a guide system in order to safely avoid undesirable, irregular combustion in both the second combustion chamber and in the first combustion chamber assigned to the failed first knock sensor.

A further embodiment is characterized by the fact that the second correction value is set higher than the first correction value, i.e. is greater than the first correction value. As a result, undesirable, irregular combustions can be avoided in a particularly safe manner in the first combustion chamber whose assigned first knock sensor has failed.

In order to realize a particularly advantageous operation of the internal combustion engine, a further embodiment of the invention provides that the internal combustion engine has at least one third combustion chamber in which combustion processes take place during a fired operation of the third combustion chamber. The previous and following statements regarding the first combustion chamber and the second combustion chamber can easily be transferred to the third combustion chamber and vice versa. The other (second) knock sensor, which is functional in the second operating state, is also assigned to the third combustion chamber, so that irregular combustions can also be detected in the third combustion chamber by means of the other (second) sensor, which is functional in the second operating state and also in the first operating state. In the first operating state, the knock control sets an ignition timing for the third combustion chamber and in particular for the respective working cycle depending on the evaluation of the (second) signal provided by the other (second) sensor that is functional in the second operating state and also in the first operating state. In the second operating state, the knock control adjusts the ignition timing for the third combustion chamber depending on the evaluation of the (second) signal provided by the other (second) knock sensor, which is functional in the second operating state and also in the first operating state, and to which the other (second) knock sensor, which is functional in the second operating state and also in the first operating state, is assigned. As a result, irregular combustions taking place in the third combustion chamber and thus damage to the internal combustion engine can also be safely avoided.

A further embodiment is characterized in that in the second operating state, setting the ignition timing for the third combustion chamber, to which the other (second) knock sensor that is functional in the second operating state and also in the first operating state is assigned, includes that the ignition timing for the third combustion chamber, to which the other (second) knock sensor that is functional in the second operating state and also in the first operating state is assigned, is offset later by a third correction value relative to a third initial value. The third initial value may correspond to the first initial value and/or the second initial value, or the third initial value is different from the first and/or second initial values. Furthermore, it is conceivable that the third correction value corresponds to the first correction value and/or the second correction value, or the third correction value is different from the first and/or second correction value.

In order to be able to particularly safely avoid unwanted, irregular combustion in the (second) combustion chamber whose associated knock sensor has failed, a further embodiment of the invention provides that an average value, in particular the arithmetic average, is calculated from the first correction value and the third correction value. The calculated average is used as the second value. Alternatively, it is provided that the second correction value is determined as a function of the mean value. The aforementioned guide system now also includes, for example, the third combustion chamber, whereby irregular combustions in the first combustion chamber can be safely avoided.

Finally, it has proven to be particularly advantageous if the second correction value is set to be greater than the mean value. For this purpose, for example, a distance value, also referred to as an offset or offset value, is added to the mean value, so that the second correction value is greater than the mean value. As a result, irregular combustion in the first combustion chamber and thus damage to the internal combustion engine can be safely avoided.

The invention is also based on the knowledge that an irregular combustion designed as pre-ignition is very loud, is therefore acoustically very noticeable and/or leads to strong structure-borne noise. The structure-borne noise runs at least nearly through the entire housing element, also known as the motor housing. If, for example, a pre-ignition occurs in the first combustion chamber whose assigned first knock sensor has failed, such a pre-ignition, which is particularly harmful to the internal combustion engine, can be detected according to the invention by means of the second knock sensor assigned to the combustion chamber and preferably also to the third combustion chamber, because in the second operating state and in particular during the or all of the working cycles of the internal combustion engine occurring in the second operating state, channel switching, in particular continuous, is omitted. If the channel switching were also carried out in the second operating state, the knock control could not detect a pre-ignition occurring in the first combustion chamber and therefore could not react to such a pre-ignition occurring in the first combustion chamber, because due to the channel switching the knock control in the second operating state would be connected to the first channel at least for a period of time within which the pre-ignition occurs in the first combustion chamber. However, because the first knock sensor is no longer able to detect this pre-ignition and because, during the occurrence of the pre-ignition in the first combustion chamber, the knock control would be connected to the first combustion chamber and thus to the first knock sensor and separated from the second channel or from the second knock sensor, the knock control would not detect the pre-ignition occurring in the first combustion chamber. According to the invention, this can now be prevented by not switching channels in the second operating state, so that in the second operating state and in particular during the or all work cycles of the internal combustion engine taking place in the second operating state, the knock control or its input with the second channel or with the second knock sensor is connected, so that the knock control can detect any irregular combustions occurring in both the first combustion chamber and in the second combustion chamber, such as in particular ignitions, since by means of the second, (still) functional knock sensor any pre-ignitions occurring can be detected or will be detected both in the first combustion chamber and in the second combustion chamber. The knock control can therefore react accordingly to any pre-ignition occurring in the second combustion chamber as well as to any pre-ignition occurring in the first combustion chamber in the second operating state and can set the ignition timing, in particular retard it, in such a way that after a pre-ignition occurs in the respective combustion chamber, further irregular combustion does not occur at least during one or more subsequent work cycles. This means that irregular combustion can be avoided without reducing the engine torque or at least without reducing it excessively.

FIG. 1 shows a schematic representation of an internal combustion engine 1 designed as a reciprocating piston engine and also referred to as a combustion motor or motor, of a motor vehicle preferably designed as a passenger vehicle, in particular as a passenger car. The internal combustion engine 1 has at least or exactly four combustion chambers 2a-d. Furthermore, the internal combustion engine 1 has a housing element 3, also referred to as a motor housing. The respective combustion chamber 2a-d is limited or formed by a respective cylinder 4a-d, which is respectively formed by the housing element 3. A respective piston is accommodated in a translationally movable manner in the respective cylinder 4a-d, so that the respective combustion chamber 2a-d is formed or delimited by the respective cylinder 4a-d and the respective piston which is accommodated in a translationally movable manner in the respective cylinder 4a-d. The respective piston is articulated via a respective connecting rod to an output shaft of the internal combustion engine 1 designed as a crankshaft 5. The crankshaft 5 is rotatably mounted on the housing element 3 around an axis of rotation relative to the housing element 3. Due to the articulated coupling of the pistons to the crankshaft 5, the translational movements of the pistons in the cylinders 4a-d can be converted into a rotational movement of the crankshaft 5. The respective combustion chamber 2a-d can be operated in a fired operation. In the respective fired operation of the respective combustion chamber 2a-d, a combustion process, also referred to as combustion, takes place within a respective working cycle of the internal combustion engine 1, in which a fuel-air mixture, also simply referred to as a mixture, is ignited at an ignition timing and thereby burned. The mixture includes air and, in particular, a liquid fuel. The mixture is preferably ignited by means of an ignition device, that is, spark ignited. The internal combustion engine 1 is therefore preferably a spark ignited internal combustion engine, in particular a gasoline engine. The respective working cycle of the internal combustion engine 1 includes exactly two complete revolutions of the crankshaft 5, i.e. 720° crank angle. Within the respective working cycle, the mixtures contained in the combustion chambers 2a-d are ignited one after the other, that is to say sequentially, in particular in such a way that within the respective working cycle, first the mixture in the combustion chamber 2a, then the mixture in the combustion chamber 2c, then the mixture in the Combustion chamber 2d and then the mixture in the combustion chamber 2b is ignited. The ignition order of the internal combustion engine 1 is thus, for example: 2a-2c-2d-2b The internal combustion engine 1 also includes at least or exactly two knock sensors 6 and 7. The knock sensor 6 is also referred to as a first knock sensor or first sensor, and the knock sensor 7 is also referred to as a second knock sensor or second sensor. The knock sensor 6 is assigned to the combustion chambers 2a, b, with irregular combustion in the combustion chambers 2a, b being detectable by means of the knock sensor 6. The knock sensor 7 is assigned to the combustion chambers 2c, d, with irregular combustion in the combustion chambers 2c, d being detectable by means of the knock sensor 7.

Figure 2:
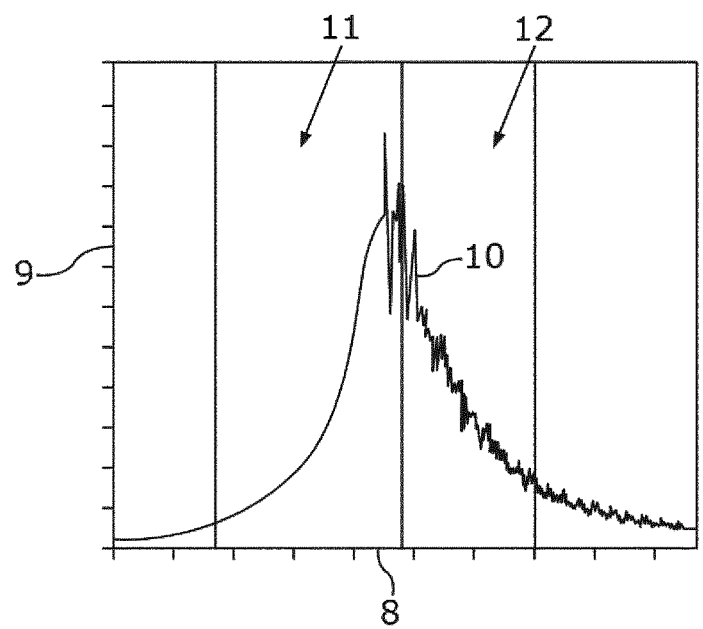
FIG. 2 is a diagram which illustrates a pressure curve in a combustion chamber of the internal combustion engine.

FIG. 2 shows a diagram on whose abscissa 8 degrees crank angle (CA) are plotted. A pressure, also referred to as combustion chamber pressure or cylinder pressure, is plotted on the ordinate 9 of the diagram shown in FIG. 2, which prevails or can prevail, for example, within the respective working cycle in the respective combustion chamber 2a-d. In addition, the diagram shown in FIG. 2 includes a curve 10, which is also referred to as a pressure curve, cylinder pressure curve or combustion chamber pressure curve. The curve 10 is a curve of the pressure prevailing in the respective combustion chamber 2a-d that takes place or occurs within the respective working cycle. Two measuring windows 11 and 12 are entered as examples in the diagram shown in FIG. 2. The measurement window 11 is also referred to as the pre-measurement window, and the measurement window 12 is also referred to as the main measurement window. For example, the main measurement window within the respective working cycle begins after the ignition top dead center (TDC) occurring within the respective working cycle. For example, the main measurement window begins at 20° after the top dead center of the ignition. For example, the main measurement window extends, in particular continuously, over 60° crank angle. The pre-measuring window begins earlier than the main measuring window within the respective working cycle and can end within the respective working cycle at a degree of crank angle at which the main measuring window begins, or the measuring windows 11 and 12 partially overlap. Furthermore, it is conceivable that the measurement window 11, also referred to as the pre-ignition measurement window, ends before the main measurement window (measurement window 12), so that there is a gap, in particular in time, between the measurement windows 11 and 12. It is therefore conceivable that the measuring windows 11 and 12 connect directly to one another, that the measuring windows 11 and 12 overlap one another, and that a particular time gap is provided between the measuring windows 11 and 12, so that the measuring window 11 ends before the measuring window 12 begins. The main measurement window extends in a first region of the respective working cycle, with irregular combustions in the form of knocking occurring or being able to occur, for example, in the first region. The pre-measuring window extends, for example, in or over a respective, second region of the respective working cycle, with irregular combustions, in particular in the form of pre-ignitions, occurring or being able to occur, for example, in the respective second region. Thus, for example, knocking can be detected in the first region or in the main measurement window using the knock sensors 6 and 7, and pre-ignition can be detected in the second region or in the pre-measuring window using the knock sensors 6 and 7.

Figure 3:
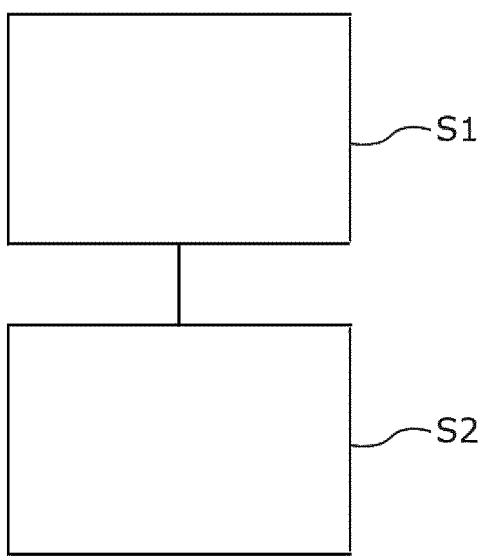
FIG. 3 is a block diagram illustrating a method for operating the internal combustion engine.

FIG. 3 shows a block diagram, based on which a method for operating the internal combustion engine 1 is described below. In a first step S1 of the method, the internal combustion engine 1 is operated, in particular initially and/or during a first time interval and preferably continuously, that is to say without interruption, in a first operating state, which is also referred to as a normal operating state. The first operating state includes several directly successive or consecutive working cycles of the internal combustion engine 1. In other words, in the first operating state, i.e. during the first operating state, several work cycles of the internal combustion engine 1 that directly follow one another, i.e. directly successive ones, take place. In the first operating state and thus in the first step S1, a channel switch is carried out, in which a knock control 13 of the internal combustion engine 1, shown particularly schematically in FIG. 1, alternately receives a first signal provided by the first knock sensor 6 during a respective first time period and a evaluates a second signal provided by the second knock sensor during a respective second period of time. In particular, it is provided that in the first operating state and within the respective working cycle of the internal combustion engine 1 that takes place or is running during the first operating state, the channel switching is carried out at least once. In the exemplary embodiment shown in the figures, the channel switching is carried out at least or exactly twice in the first operating state and within the respective working cycle of the internal combustion engine 1 that runs during the first operating state. First, for example, the knock control 13, in particular an input of the knock control 13, is connected to a first channel, via which the knock control 13 can receive the first signal of the knock sensor 6, and thereby disconnected from a second channel, via which the knock control 13 detects the second signal of the knock sensor 6. Within the respective working cycle, as part of the channel switching, the knock control 13 or its input is separated from the first channel and connected to the second channel, whereupon the knock control 13 or its channel is again separated from the second channel and connected to the first channel. Thus, in the first operating state, the knock control 13 can first detect any irregular combustion occurring in the combustion chamber 2a from the first signal. The knock control 13 can then detect any irregular combustion occurring in the combustion chambers 2c, d using the second signal or by means of the second knock sensor 7 or via the second knock sensor 7. The knock control 13 can then again use the first signal, that is to say via the first knock sensor 6, to detect any irregular combustion occurring in the combustion chamber 2b. It is therefore provided in the method that in the first operating state and thus in the first step S1, the knock control 13 sets the respective ignition timing for the combustion chambers 2a, b depending on the evaluation of the first signal, and the knock control adjusts the respective ignition timing for the combustion chambers 2c, d depending on this evaluation of the second signal. Expressed again in other words, the channel switching is carried out in the first operating state within the or all work cycles of the internal combustion engine 1 occurring in the first operating state.

In a second step S2 of the method, it is determined, for example, that the first knock sensor 6 is inoperative and the second knock sensor 7 is (still) functional. As a result, in the second step S2, a switch is made from the first operating state to a second operating state of the internal combustion engine 1, the second operating state also being referred to as error operation or error operating state. The internal combustion engine 1 is, for example, operated in the second operating state, in particular continuously and thus without interruption, during a second time interval following the first time interval and in particular directly following the first time interval. It is preferably provided that the second operating state includes several, in particular directly adjacent or successive working cycles of the internal combustion engine 1. This means that several, in particular directly successive, work cycles of the internal combustion engine 1 take place or run during the second time interval or in the second operating state. Furthermore, it is provided that in the second operating state the channel switching does not occur, whereby the knock control 13 only evaluates the second signal provided by the functional, second knock sensor 7 based on the signals provided by the knock sensors 6 and 7 in the first operating state. In the exemplary embodiment shown in the figures, it is thus provided that in the second operating state and thus within the or all working cycles of the internal combustion engine 1 that take place during the second operating state or in the second operating state, the knock control 13 is connected, in particular continuously, to the second channel and, in particular continuously, is separated from the first channel, so that the knock control 13 is connected, in particular continuously, to the second channel and separated from the first channel, for example during the or all working cycles of the internal combustion engine 1 running in the second operating state. Expressed again in other words, it is preferably provided that in the second operating state and during the entire second time interval and thus during the or all work cycles of the internal combustion engine 1 running in the second operating state, the knock control 13, in particular the input of the knock control 13, is connected, with the first channel is omitted.

In the second operating state and thus in the second step S2, the knock control 13 sets the ignition timing for the combustion chambers 2c, d, to which the functional, second knock sensor 7 is assigned, depending on the evaluation of the second signal provided by the functional, second knock sensor 7. In addition, in the second operating state and thus in a second step S2 of the method, the knock control 13 also sets the respective ignition timing for the combustion chambers 2a, b, to which the non-functional, first knock sensor 6 is assigned, as a function of the evaluation of the second signal provided by the functional, second knock sensor.

It is preferable that, in the first operating state, the respective ignition timing for the combustion chambers 2a, b is not set depending on the second signal and that the respective ignition timing for the combustion chambers 2c, d is not set depending on the first signal.

In the second operating state, setting the ignition timing for the combustion chambers 2c, d, to which the functional, second knock sensor 7 is assigned, includes, for example, that the respective ignition timing for the combustion chambers 2c, d based on a respective, first initial value is offset later by a respective, first correction value, especially within the respective work cycle. It is preferably provided that in the second operating state the setting of the ignition timing for the combustion chambers 2a, b includes that the ignition timing for the combustion chambers 2a, b is offset later by a respective second correction value in relation to a respective second initial value, especially within the respective work cycle. Preferably, the respective second correction value is determined as a function of the respective first correction value. This is done, for example, in such a way that the respective first correction value is added to the respective first initial value and the respective second correction value is added to the respective second initial value.

In order to be able to avoid irregular combustion especially safely and, in particular, avoid pre-ignition in the combustion chambers 2a, b, whose associated knock sensor 6 has failed and is therefore inoperative, it is preferable that an average value, in particular the arithmetic mean, is calculated from the first correction values by which the ignition times for the combustion chambers 2c, d are offset later. For example, the respective second correction value by which the respective ignition timing for the combustion chambers 2a, b is retarded in the second operating state is determined as a function of the mean value, in particular in such a way that the respective second correction value by which the respective ignition timing for the combustion chambers 2a, b is offset later, is set greater than the calculated mean value. For this purpose, for example, a distance value, also referred to as an off-set or off-set value, is added to the calculated mean value, whereby the respective second correction value is calculated from the mean value and the distance value, by which the respective ignition timing for the combustion chambers 2a, b in the second operating state is offset later. It can be seen that the combustion chambers 2c, d and the still functional knock sensor 7 are used as a guidance system, based on which the ignition timings are also set, in particular offset later, for the combustion chambers 2a, b whose assigned knock sensor 6 has failed. As a result, undesirable, irregular combustions occurring in the combustion chambers 2a, b can also be avoided in the second operating state without having to excessively reduce the filling of the combustion chambers 2a-d and therefore reduce the maximum torque, also referred to as engine torque, that can be provided by the internal combustion engine 1. Therefore, on the one hand, damage to the internal combustion engine 1 can be avoided, and on the other hand, particularly advantageous drivability of the internal combustion engine 1 can be ensured. The method thus enables particularly advantageous operation of the internal combustion engine 1.

REFERENCE SYMBOL LIST

1 Internal combustion engine
2a-d Combustion chamber
3 Housing element
4a-d Cylinder
5 Crankshaft
6 First knock sensor
7 Second knock sensor
8 Abscissa
9 Ordinates
10 Curve
11 Measuring window
12 Measuring window
13 Knock control
S1 First step
S2 Second step

The invention claimed is:

1. A method for operating an internal combustion engine, comprising: operating an internal combustion engine that comprises:
- a first combustion chamber in which combustion processes take place during a fired operation of the first combustion chamber;
- a second combustion chamber, in which combustion processes take place during a fired operation of the second combustion chamber;
- a first knock sensor assigned to the first combustion chamber, by means of which irregular combustions in the first combustion chamber can be detected; and
- a second knock sensor assigned to the second combustion chamber, by means of which irregular combustions in the second combustion chamber can be detected;
- operating the internal combustion engine in a first operating state, in which:
- a channel switch is carried out, in which a knock control alternates between evaluating a first signal provided by the first knock sensor during a respective first time period and evaluating a second signal provided by the second knock sensor during a respective second time period;
- the knock control sets (an) ignition timing for the first combustion chamber depending on the evaluation of the first signal; and
- the knock control sets (an) ignition timing for the second combustion chamber depending on the evaluation of the second signal; and
- in response to determining that one of the knock sensors is inoperative and the other knock sensor is functional, switching from the first operating state to a second operating state, in which:
- the channel switch does not occur, and the knock control only evaluates the signal provided by the functional knock sensor;
- the knock control sets the ignition timing for the combustion chamber that is assigned to the functional knock sensor, depending on the evaluation of the signal provided by the functional knock sensor; and
- the knock control sets the ignition timing for the combustion chamber that is assigned to the non-functional knock sensor, depending on the evaluation of the signal provided by the functional knock sensor.

2. The method according to claim 1 wherein,
in the first operating state:
   the ignition timing for the first combustion chamber is not adjusted depending on the second signal; and
   the ignition timing for the second combustion chamber is not adjusted depending on the first signal.

3. The method according to claim 1 wherein the second operating state further comprises setting the ignition timing for the combustion chamber that is assigned to the functional knock sensor based on a first initial value which is offset later by a first correction value.

4. The method according to claim 3, the second operating state further comprises, setting the ignition timing for the combustion chamber that is assigned to the non-functional knock sensor based on a second initial value, which is offset later by a second correction value.

5. The method according to claim 4, wherein the second correction value is determined depending on the first correction value.

6. The method according to claim 5, wherein the second correction value is set greater than the first correction value.

7. The method according to claim 1, wherein:
   the internal combustion engine further comprises a third combustion chamber, capable of a fired operation in which combustion processes take place;
   the knock sensor that is functional in the second operating state is also assigned to the third combustion chamber, such that irregular combustions can also be detected in the third combustion chamber;
   in the first operating state, the knock control sets the ignition timing for the third combustion chamber depending on the evaluation of the signal provided by the knock sensor that is functional in the second operating state; and
   in the second operating state, the knock control adjusts the ignition timing for the third combustion chamber depending on the evaluation of the signal provided by the knock sensor that is functional in the second operating state.

8. The method according to claim 7 where, in the second operating state, setting the ignition timing for the third combustion chamber, that is assigned to the functional knock sensor, is based on a initial value which is offset later by a third correction value.

9. The method according to claim 8, further comprising calculating a mean value from the first correction value and the third correction value, wherein:
   the mean value is used as the second correction value; or
   the second correction value is determined depending on the mean value.

10. The method according to claim 9, wherein the second correction value is set greater than the mean value.

* * * * *